United States Patent [19]
Kim

[11] Patent Number: 6,157,772
[45] Date of Patent: Dec. 5, 2000

[54] METHOD AND APPARATUS FOR RESERVED-RECORDING A PLURALITY OF BROADCAST PROGRAMS

[75] Inventor: Jin-Hwi Kim, Suwon, Rep. of Korea

[73] Assignee: Samsung Electronics Co., Ltd., Kyungki-Do, Rep. of Korea

[21] Appl. No.: 09/048,299

[22] Filed: Mar. 26, 1998

[30] Foreign Application Priority Data

Mar. 27, 1997 [KR] Rep. of Korea ................ 97-10960

[51] Int. Cl.$^7$ ..................................... H04N 5/91
[52] U.S. Cl. ................. 386/83; 455/186.1; 360/73.06
[58] Field of Search ............... 386/83, 67, 87; 360/69–71, 73.06; 455/186.1; H04N 5/91

[56] References Cited

U.S. PATENT DOCUMENTS

| | | | |
|---|---|---|---|
| 5,032,937 | 7/1991 | Suzuki et al. | 360/73.06 |
| 5,315,452 | 5/1994 | Hong | 386/46 |
| 5,353,121 | 10/1994 | Young et al. | 348/563 |
| 5,543,933 | 8/1996 | Kang et al. | 386/83 |
| 5,661,526 | 8/1997 | Hamamoto et al. | 348/465 |
| 5,901,006 | 5/1999 | Van Der Kruk | 360/69 |

*Primary Examiner*—Thai Tran
*Assistant Examiner*—Vincent F. Boccio
*Attorney, Agent, or Firm*—Sughrue, Mion, Zinn, Macpeak & Seas, PLLC

[57] ABSTRACT

A reserved-recording method and apparatus is provided in which a plurality of broadcast programs reserved within a certain time are recorded as many as possible within the limit of capacity of a recording medium. The apparatus includes a key input portion, am memory for storing reserved-recording information of the programs, an on-screen-display (OSD) for displaying character data involving reserved-recording set states of the programs, a timer for checking a current time of a system, and a recording start time and a recording end time of the reserved programs, a detector for detecting and outputting states of a supply reel and a take-up reel and a frequency generator (FG) signal of the capstan motor, a recorder for recording the received broadcast programs, and a system controller for controlling the above whole blocks in order to reserved-record the plurality of broadcast programs. When it becomes a reserved-recording start time, the system controller calculates a tape remaining time and a just-recording time based on the whole reserved broadcast programs, and then controls the programs to be recorded in the SP recording speed mode if the just-recording time is shorter than the tape remaining time, while it controls the programs to be recorded in the SLP recording speed if the former is equal to or longer than the latter. Thus, the reserved-recording method and apparatus records the plurality of the reserved programs as many as possible within the limit of capacity of the recording medium, in which the programs are recorded in the SP mode having a good picture quality up to a proper certain point of time, and then recorded in the SLP mode, thereby providing the picture quality of the programs to be enhanced at best.

13 Claims, 3 Drawing Sheets

FIG. 1A

```
       RESERVATION
        CONFIRM 1. 06 01/15 10:00-12:00 SP
```

FIG. 1B

```
       RESERVATION
        CONFIRM 2. 06 01/15 09:00-12:00 SLP
```

FIG. 2

```
       RESERVATION
        CONFIRM 2. 06 01/15 09:00-12:00 AUTO
```

```
         RESERVATION
          CONFIRM 1.  06  01/15  09:00-12:00  AUTO
2.  06  01/15  18:00-19:00  AUTO
3.  07  01/15  20:00-21:00  AUTO
```

METHOD AND APPARATUS FOR RESERVED-RECORDING A PLURALITY OF BROADCAST PROGRAMS

BACKGROUND OF THE INVENTION

The present invention relates to a method for reserved-recording broadcast programs in a recorder and an apparatus therefor, and more particularly, to a method for recording a plurality of broadcast programs which are reserved for a certain period of time, within the limit of capacity of a recording medium, and an apparatus therefor.

There are a general recording method and a reserved-recording method for recording a television broadcast program (hereinafter, referred to as a "program"). The general recording method records on a recording medium programs of a current reception channel according to a user selecting a recording mode. Meanwhile, in the reserved recording method, if a user presets information including a channel number, a recording start time, a recording end time and a recording speed of a program to be recorded, a video cassette recorder (VCR) detects the recording start time of the reserved program to automatically record the corresponding program, and detects the recording end time during recording to finish the recording operation. In the recording methods, a recording speed mode representative of a running speed of a tape includes a standardized SP (standard play) mode, a LP (long play) mode having half the tape speed of the SP mode, a SLP (super long play) mode having one third tape speed of the SP mode, and an AUTO (automatic play) mode allowing the system to select the tape recording speed automatically.

A conventional reserved recording method will be described below with reference to FIGS. 1A, 1B and 2. Referring to FIG. 1A, a user reserved-records in a SP mode a program which is broadcasted via channel 6 from 10 a.m. to 12 a.m. on January 15. Also, referring to FIG. 1B, a user reserved-records in a SLP mode a program which is broadcasted via channel 6 from 09 a.m. to 12 a.m. on January 15. As such, the user compares the reserved-recording time of the program with a remaining time of tape and then manually sets the recording speed such as a SP mode or a SLP mode, in the prior art. Such a method may cause inconveniences because the user must calculate the reserved-recording time and the tape remaining time and always set a corresponding recording speed based on calculation result.

To solve the above problem, there has been a method for setting a recording speed mode to an AUTO mode by a user. There are two types of methods for setting a method for recording a reserved program in an AUTO mode in a VCR. One is a method for comparing a reserved-recording time and a tape remaining time with each other, to then determine a recording speed when a VCR starts a reserved-recording. If the reserved-recording time is equal to or shorter than the tape remaining time, the VCR records the program in a SP mode from the beginning, while if the former is longer than the latter, the VCR records the program in a SLP mode from the beginning. In this method, assuming that the tape remaining time of a tape cassette loaded into the VCR is 120 minutes, if a reserved-recording time of the program is 180 minutes as in an example of FIG. 2 where the program is set in an AUTO mode, the reserved-recording time is longer than the tape remaining time. Accordingly, the VCR selects the SLP mode from the recording start time to thereby record the program of 180 minutes on the 60-minute capacity of tape, and leaves the remaining 60-minute tape time to then finish the recording operation. In this case, since the VCR records the program in the SLP mode from the recording start time, there is a drawback that picture quality of the recorded program is deteriorated compared with the case when the program are recorded in the SP mode.

The other method to solve the problem is called a just-recording method, in which the reserved-recording remaining time and the tape remaining time are continuously checked and compared with each other from the recording start point of time, and the program is recorded in the SP mode whose picture quality if better than that of the SLP mode up to an appropriate point of time, and thereafter the programs are recorded in the SLP mode so as not to leave the tape remaining time. Specifically, when it reaches the recording start point in time of the reserved program, a system controller of the VCR calculates a tape remaining time according to a reel state detect signal and a just-recording time according to the following equation (1), respectively, and compares the two values. If the just-recording time is shorter than the tape remaining time, the system controller controls the receives program to be recorded in the SP mode. If the just-recording time is equal to or longer than the tape remaining time during recording of the reserved program, the system controller controls the received program to be recorded in the changed SLP mode.

$$J = \frac{(R-T)}{2} \qquad (1)$$

Here, J represents a just-recording time, R represents the reserved-recording remaining time of a corresponding program, and T represents a tape remaining time. In other words, the reserved-recording remaining time of the corresponding program is obtained by subtracting a current time of the system from a recording end time of the reserved program, and the tape remaining time is calculated as a recordable remaining time of the tape wound on a supply reel in the standard recording speed mode (SP) by analyzing a signal detected from a reel status detector under the control of the system controller.

As an explanation example, it is assumed that user reserves a program to be recorded as shown in FIG. 2, and a 120-minute tape cassette is loaded into a VCR and rewound to the beginning state. If it becomes 9 a.m. on January 15, the timer in the VCR detects the time and informs the system controller that it has reached the reserved recording start time. The system controller reads information on the reserved program from a memory, receives current time information from the timer to calculate a reserved-recording remaining time of the corresponding program, and analyzes the signals from the reel status detector for detecting the states of a supply reel and a take-up reel to calculate the remaining time of the tape. As a result of calculation, since the reserved-recording remaining time of the program is 180 minutes and the tape remaining time is 120 minutes at the point of time when the recording of the program starts, the just-recording time becomes 30 minutes corresponding to (180 minutes–120 minutes)/2 according to the above equation (1). Thus, since the just-recording time is shorter by 90 minutes than the tape remaining time, the system controller controls the corresponding program to be recorded in the SP mode at the beginning. Thereafter, the tape remaining time and the just-recording time are continuously calculated and compared with each other, and thus it is compared whether the just-recording time matches the tape remaining time. If 90 minutes passes while the above process is repeated continuously, the reserved-recording remaining time of the program becomes 90 minutes, the tape remaining time does 30 minutes, and the just-recording time does 30 minutes in the result of calculation of (90−30)/2 according to the above equation (1). Thus, since the just-recording time matches the tape remaining time, the system controller changes the recording speed into the SLP mode, to then record the corresponding program of 90-minute length for the remaining 30 minutes. As a result, the reserved-recording apparatus adopting the just-recording method records, at maximum, the program in the SP mode whose picture quality is better than that of the SLP mode, and then records the remaining of the program in the SLP mode on the remaining length of the tape.

However, the conventional reserved-recording method adopting the above just-recording method operates only in units of a single program. In more detail, although a plurality of programs are set for reserved recording, the conventional reserved-recording method calculates the just-recording time in units of a single program as expressed in the equation (1), and compares the calculated just-recording time with the tape remaining time, to change the recording speed of the program at an appropriate point in time. Thus, if the reserved-recording time of the firstly reserved program is longer than the tape remaining time, the tape remaining time is insufficient. As a result, a VCR may not record the subsequently reserved programs, which will be described with reference to FIG. 3.

FIG. 3 shows a state where three programs are reserved in the AUTO mode. It is assumed that a user reservation-sets desired programs as shown in FIG. 3, a 120-minute tape cassette is loaded into a VCR and rewound up to the beginning state. In this case, if the VCR performs a reservation recording by use of the conventional just-recording method as shown in an explanation example of FIG. 2, the first program shown in FIG. 3 can be recorded, and the following programs cannot be recorded at all since the tape remaining time is insufficient. Here, if the user wishes to record all the program subsequently to the second program, the conventional reserved-recording method cannot meet the user desire.

SUMMARY OF THE INVENTION

To solve the above problems, it is an object of the present invention to provide a method for reserved-recording a plurality of programs, in which a plurality of reserved programs are recorded within the allowable limit of capacity of a recording medium, and picture quality of the programs to be recorded is improved under such a condition, by comparing a just-recording time calculated based on the whole of a plurality of the reserved broadcast programs with a remaining time of a recording medium, to thereby change a recording speed at an appropriate point in time during recording of the programs.

It is another object of the present invention to provide an apparatus embodying the above method.

To accomplish the above object of the present invention, there is provided a method for reserved-recording a plurality of broadcast programs in a recorder, the reserved-recording method comprising the steps of:

(a) setting reserved-recording information involving broadcast programs to be recorded;

(b) if a reserved-recording starts after a recording medium is loaded into the recorder, continuously calculating a remaining time of the recording medium in the standard recording speed mode (SP), and calculating a just-recording time based on a total reserved-recording remaining time with respect to the while reserved-recording programs and the remaining time of the recording medium; and (c) after comparing the calculated just-recording time with the remaining time of the recording medium, recording the programs which are received in a first recording speed mode if the former is shorter than the latter, and recording the received programs in a second recording speed mode slower than the first recording speed mode if the former is equal to or longer than the latter.

To accomplish another object of the present invention, there is also provided an apparatus for reserved-recording a plurality of broadcast programs, the reserved-recording apparatus comprising:

a key input portion for inputting reserved-recording information involving the plurality of broadcast programs to be recorded; a memory for storing information involving the broadcast programs input from the key input portion; a timer for checking and outputting time information involving a current time of a system, and a recording start time and a recording end time of the reserved programs; detection means for detecting and outputting states involving a remaining length of a recording medium loaded into a recorder; a system controller for analyzing the signals received from the detection means to calculate a remaining time of the recording medium in the standard recording speed mode (SP), and calculating a total reserved-recording remaining time based on the reserved-recording information involving the plurality of broadcast programs stored in the memory and the time information of the timer to thereby calculate a just-recording time therefrom, and after comparing the calculated just-recording time with the remaining time of the recording medium, outputting a first control signal corresponding to a first recording speed mode if the former is shorter than the latter, and outputting a second control signal corresponding to a second recording speed mode slower than the first recording speed mode if the former is equal to or longer than the latter; and recording means for recording the received broadcast programs on the recording medium by producing motor drive signal corresponding to the control signals from the system controller and driving motors based on the produced motor drive signals.

In addition, the present invention further comprises an on-screen-display (OSD) for displaying character data involving reserved-recording set states of the plurality of broadcast programs according to manipulation of the key input portion by a user.

BRIEF DESCRIPTION OF THE DRAWINGS

The preferred embodiment is described with reference to the drawings wherein:

FIG. 1A is a view showing a screen state when a program to be recorded is reserved-recorded in a SP recording speed mode;

FIG. 1B is a view showing a screen stat when a program to be recorded is reserved-recorded in a SLP recording speed mode;

FIG. 2 is a view showing a screen state when a program to be recorded is reserved-recorded in an AUTO recording speed mode;

DETAILED DESCRIPTION OF THE PREFERRED EMBODIMENTS

Figure 5:
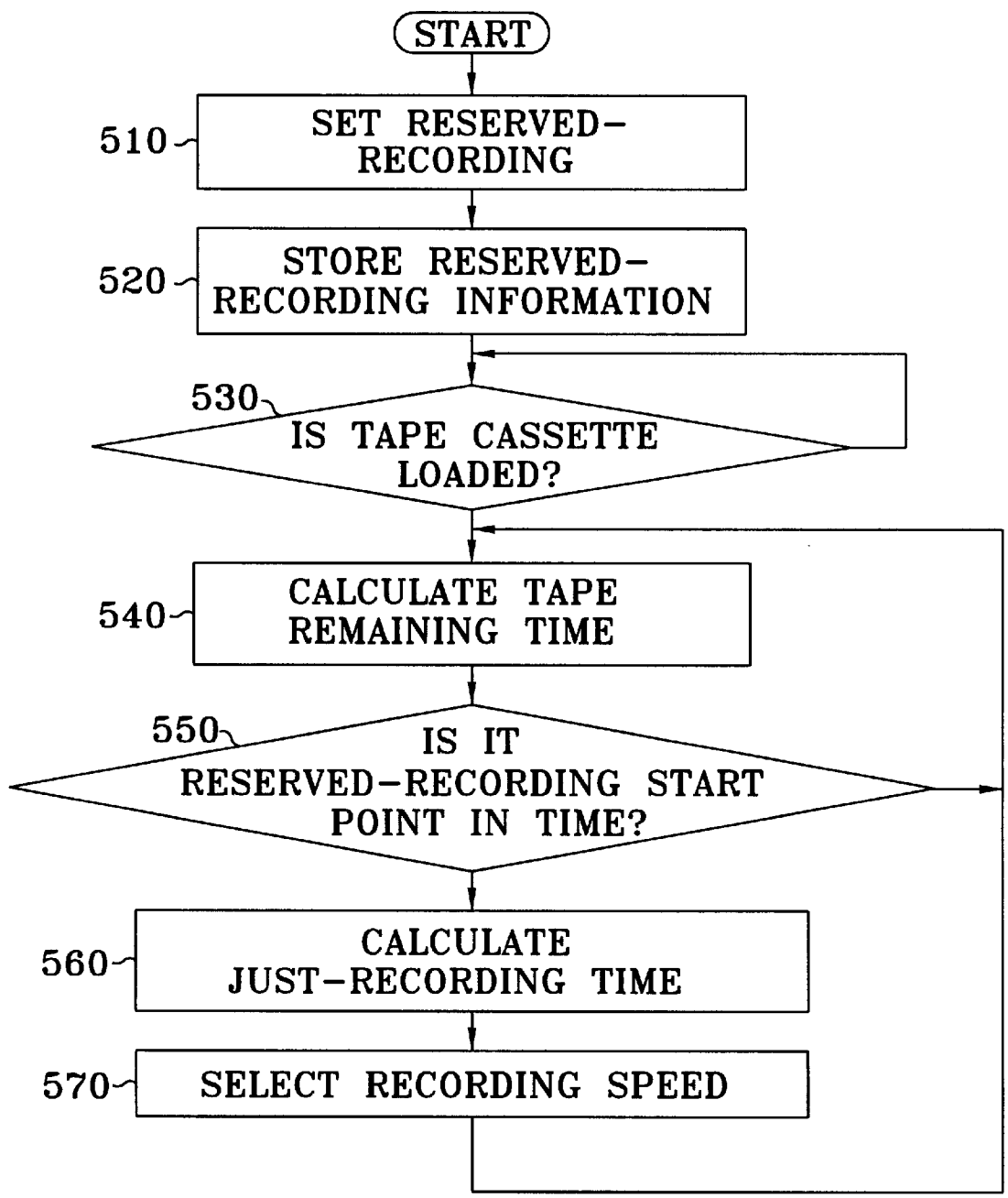
FIG. 5 is a flowchart diagram illustrating a method for controlling the respective blocks of FIG. 4 and reserved-recording a plurality of broadcast programs according to the present invention.

A preferred embodiment of the present invention will be described in detail with reference to FIGS. 4 and 5.

Figures 3, 4:
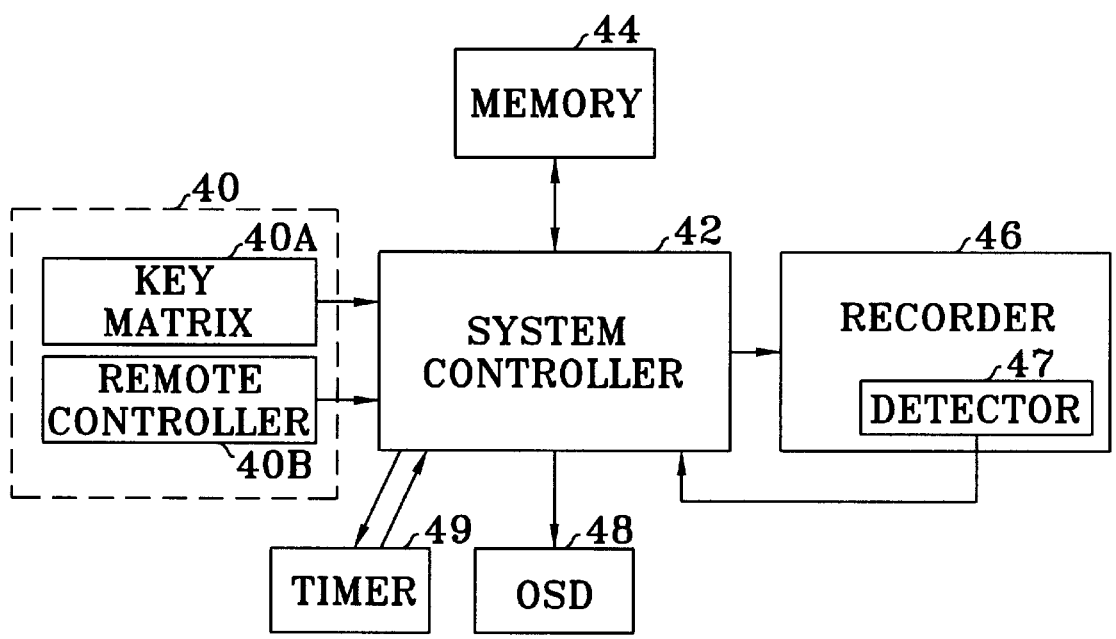
FIG. 3 is a view showing a screen state when a plurality of broadcast programs to be recorded are reserved-recorded in an AUTO recording speed mode.
FIG. 4 is a block diagram showing the structure of an apparatus for reserved-recording a plurality of broadcast programs according to the present invention.

Referring to FIG. 4, a reserved-recording apparatus includes a key input portion including a key matrix 40a or a remote controller 40b, and a system controller 42 for receiving a reserved-recording function and reserved-recording information involving a plurality of programs from the key input portion 40 and controlling respective blocks in order to perform the reserved-recording function of the plurality of programs. A memory 44 connected to the system controller 42 stores the reserved-recording information involving the plruaity of programs input from the key input portion 40. A timer 49 connected to the system controller 42 detects a current time of the system and a recording start time and a recording end time of the reserved programs and informs the system controller 42 of the detected result. Meanwhile, a recorder 46 is connected to the system controller 42. The recorder 46 produces motor drive signals corresponding to a recording speed control signal of the system controller 42, and drives motors which are not shown in the drawing. As a result, video signals involving the broadcast programs input from a separate video processor (not shown) are recorded on a recording medium. Also, the recorder 46 includes a detector 47. The detector 47 detects state signals of a supply reel and a take-up reel and a frequency generator (FG) signal of a capstan motor and supplies the detected result to the system controller 42. In addition, an OSD 48 connected to the system controller 42 displays character data involving a reservation set state of a plurality of programs according to user's manipulation of the key input portion 40 on a system panel (not shown), or combines the character data with a video signal input from a separate video processor display the combined result on a monitor.

The operation of the FIG. 4 apparatus having the above structure will be described with reference to FIG. 5. First, a user manipulates the key input portion 40 to thereby set reserved-recording information involving a plurality of programs to be recorded (step 510). Then, the system controller 42 controls the OSD 48 to display a current reserved state on a monitor or a system panel in response to the key input signal of the key input portion. At the same time, the system controller 42 controls the memory 44 to store the reserved-recording information involving the plurality of programs input from the key input portion 40 (step 520). Then, the system controller 42 checks whether or not a tape cassette is loaded until the tape cassette is loaded into the system (step 530).

If the tape cassette is completely loaded, the system controller 42 analyzes the signals input from the detector 47 and calculates a tape remaining time in the standard recording speed mode (SP), using a technology which is well-known to one skilled in the art (step 540). Here, the detector 47 detects states of a supply reel and a take-up reel provided in a recorder, and a FG signal of the capstan motor, and outputs the detected result to the system controller 42. The system controller 42 analyzes the received states of the supply reel and the take-up reel and the FG signal both of which are detected by the detector 47, and calculates the tape remaining time corresponding to a remaining amount of tape of the supply reel.

Also, the system controller 42 receives time information from the timer 49 and checks if it is a recording start point in time of the reserved program according to the input time information (step 550). As a result of checking, if it is not the reserved-recording start point of time, the system controller 42 returns to step 540, while if it is the reserved-recording start point of time, a just-recording time is calculated (step 560). Here, the just-recording time is calculated based on a total reserved-recording remaining time of the reserved programs and the tape remaining time calculated in step 540. The just-recording time according to the present invention is calculated by the following equation (2).

$$J = \frac{(R' - T)}{2} \qquad (2)$$

Here, J represents a just-recording time, R' represents a total reserved-recording remaining time, and T represents a tape remaining time. In other words, the total reserved-recording remaining time is obtained by summing each reserved-recording remaining time of the plurality of the reserved programs. The reserved-recording remaining time of the current program under recording is obtained by subtracting the current system point in time from the recording end point in time of the corresponding program. Each reserved-recording remaining time of the reserved remaining programs is obtained by subtracting the recording start point in time of the corresponding program from the recording end point in time thereof.

If the tape remaining time is calculated in step 540 and the just-recording time involving the plurality of the reserved programs is calculated in step 560, the system controller 42 compares the calculated tape remaining time with the just-recording time to thus select a recording speed (step 570). In this case, if the just-recording time is shorter than the tape remaining time, the system controller 42 selects a SP mode being a standard recording speed, while if the former is equal to or longer than the latter, the system controller 42 selects a SLP mode being ⅓ recording speed of the SP mode. If the recording speed is selected, the system controller 42 applies a control signal corresponding to the selected recording speed to the recorder 46. The recorder 46 records a broadcast program signal input from a video processor (not shown) on the tape in correspondence to the applied recording speed control signal.

The above reserved-recording method will be described below with reference to FIG. 3 which shows a case where a plurality of programs are reserved-recorded. First, assuming that a tape remaining time is 120 minutes, which is calculated at 9 a.m. on January 15 being a reserved-recording start point in time of a firstly reserved program in FIG. 3, a total reserved-recording remaining time of the reserved programs becomes 300 minutes obtained by summing 180 minutes of the first program, 60 minutes of the second program and 60 minutes of the third program. At this time, the just-recording time become 90 minutes according to the equation (2. Thus, since the just-recording time of 90 minutes is shorter than the tape remaining time of 120 minutes in the result of comparison of both the just-recording time and the tape remaining time, the system controller 42 selects a SP mode. Since the recording speed is selected as the SP mode at the recording start point in time of the first program, the system controller 42 outputs a control signal so that the received program is recorded in the SP mode. The recorder 46 starts recording the program received from a separate video processor on the tape in the SP mode under the control of the system controller 42. Thereafter, although steps 540 through 570 shown in FIG. 5 are repeated, the just-recording time continuously calculated for 30 minutes is shorter than the tape remaining time, thereby the recording speed not being changed.

If 30 minutes have passed from the recording start point in time of the first program, the measured tape remaining time becomes 90 minutes, the total reserved-recording remaining time becomes 270 minutes and the just-recording time of the equation (2) becomes 90 minutes since the recording has been performed in the SP mode being the standard speed for 30 minutes. Thus, since the just-recording time is equal to the tape remaining time, the system controller 42 selects the recording speed of the program to be recorded in a SLP mode, and outputs a corresponding control signal. The recorder 46 records the program received from the separate video processor on theta eat recording speed corresponding to the SLP mode. Thereafter, since the just-recording time is longer than the tape remaining time, the system controller 42 controls the program to be recorded while maintaining the recording speed in the SLP mode.

Thus, as shown in FIG. 3, in the case where the three programs are reserved and the tape remaining time is 120 minutes at the recording start point of time, the reserved-recording apparatus embodying the reserved-recording method according to the present invention records the first reserved program of 30-minute length in the SP mode for 30 minutes from the recording start point of time, and then records all the reserved remaining programs of 270-minute length in the SLP mode for the tape remaining time of 90 minutes.

Meanwhile, since the SLP mode can allow the three-times capacity of programs to be recorded in comparison with the SP mode, when a remaining time of a recording medium is 120 minutes at the recording start point in time and the above-described SP/SLP recording speed modes are used, the reserved-recording apparatus embodying the reserved-recording method according to the present invention can record all the reserved programs of 360-minute length. That is, when the total reserved-recording remaining time of the reserved programs is 360 minutes, the reserved-recording apparatus according to the present invention operates in the SLP mode from the recording start point in time to thereby record all the reserved programs on the tape of 120-minute length.

Also, the above SLP recording speed mode can be replaced with a LP mode having a ½ recording speed compared with the SP mode. In this case, the plurality of the reserved programs are properly changed using the equation (2) so that the programs can be recorded in the just-recording method.

In addition, the method for reserving-recording a plurality of broadcast programs according to the present invention can be applied to a VCR provided with a double deck (not shown). In this case, the remaining time of the recording medium is obtained by summing the remaining times of the recording media loaded into respective decks.

Thus, the reserved-recording apparatus embodying the reserved-recording method according to the present invention compares the just-recording time calculated on the basis of a plurality of the whole reserved broadcast programs with the tape remaining time, and records the programs in the SP mode having a good picture quality up to a proper certain point of time, and thereafter records the programs in the SLP mode. As a result, a plurality of the reserved programs are recorded within the limit of capacity of the recording medium. The picture quality of the programs recorded under the condition can be enhanced at best.

While only certain embodiments of the invention have been specifically described herein, it will be apparent that numerous modifications may be made thereto without departing from the spirit and scope of the invention.

What is claimed is:

1. A method for reserving-recording a plurality of broadcast programs in a recorder, comprising the steps of:

(a) setting reserved-recording information for broadcast programs to be recorded;

(b) when reserved-recording starts after a recording medium is loaded into the recorder, continuously calculating a remaining time of the recording medium in a standard play recording speed mode;

(c) calculating a just-recording time based on a total reserved-recording remaining time with respect to all of the broadcast programs to be recorded and a remaining time of the recording medium; and (d) after comparing the just-recording time with the remaining item of the recording medium, recording the broadcast programs at a first recording speed mode when the just-recording time is shorter than the remaining time of the recording medium, and recording the broadcast programs at a second recording speed mode slower than the first recording speed mode when the just-recording time is equal to or longer than the remaining time of the recording medium.

2. The method according to claim 1, wherein the step of setting the reserved-recording information for the broadcast programs in step (a) comprises the steps of setting a channel number, a recording start point of time, a recording end point in time of each broadcast program to be reserved-recorded, and an automatic (AUTO) recording speed mode.

3. The method according to claim 1, wherein step (b) for calculating the remaining time of the recording medium comprises the step of analyzing state signals of reels holding the recording medium and a frequency generator (FG) signal of a capstan motor.

4. The method according to claim 1, wherein said first recording speed mode is the standard play recording speed (SP) mode which is a standard speed of the recording medium, and said second recording speed mode is a super long play recording speed (SLP) mode which is ⅓ of the standard recording speed.

5. The method according to claim 1, wherein the recording medium is a video cassette tape and said recorder is a video cassette recorder (VCR).

6. A method for reserved-recording a plurality of broadcast programs in a recorder, comprising the steps of:

(a) setting reserved-recording information for broadcast programs to be recorded;

(b) when reserved-recording starts after a recording medium is loaded into the recorder, continuously calculating a remaining time of the recording medium in a standard play recording speed mode (SP);

(c) calculating a just-recording time using the following equation, $$J = \frac{(R' - T)}{2}.$$

in which J represents the just-recording time, R' represents a total reserved-recording remaining time and T represents the remaining time of the recording medium, the total reserved-recording remaining time being obtained by summing each reserved-recording remaining time of the broadcast programs to be recorded along with a reserved-recording remaining time of a broadcast program being currently recorded, the reserved-recording remaining time of the current broadcast program being obtained by subtracting a current point in time from a recording end point in time of the current broadcast program, and each reserved-recording remaining time of remaining broadcast programs to be recorded being obtained by subtracting a recording start point in time of a corresponding broadcast program from a recording end point in time of the corresponding broadcast program; and (d) comparing the just-recording time with the remaining time of the recording medium, then recording the broadcast programs at a first recording speed mode when the just-recording time is shorter than the remaining time of the recording medium, and recording the broad cast programs at a second recording speed mode slower than the first recording speed mode when the just-recording time is equal to or longer than the remaining time of the recording medium.

7. An apparatus for reserved-recording a plurality of broadcast programs, comprising:

a key input portion for inputting reserved-recording information for the plurality of broadcast programs to be recorded;

a memory for storing the reserved-recording information input from the key input portion;

a timer for checking and outputting time information for a current time of a system, and a recording start time and a recording end time and each of the broadcast programs to be recorded;

detection means for detecting and outputting signals of a remaining length of a recording medium loaded into a recorder;

a system controller for analyzing the state signals received from the detection means to calculate a remaining time of the recording medium in a standard play recording speed mode (SP), and calculating a tool reserved-recording remaining time based on the reserved-recording information for the plurality of broadcast programs stored in the memory and the time information of the timer to thereby calculate a just-recording time, and after comparing a calculated just-recording time with the remaining time of the recording medium, outputting a first control signal corresponding to a first recording speed mode when the calculated just-recording time is shorter than the remaining time of the recording medium, and outputting a second control signal corresponding to a second recording speed mode slower than the first recording speed mode when the just-recording time is equal to or longer than the remaining time of the recording medium; and recording means for recording the broadcast programs on the recording medium by producing motor drive signal corresponding to the first and second control signals from the system controller and driving motors based on the motor drive signals.

8. The reserved-recording apparatus according to claim 7, further comprising and on-screen-display (OSD) for displaying character data of reserved-recording set states of the plurality of broadcast programs according to a user's manipulation of the key input portion.

9. The reserved-recording apparatus according to claim 7, wherein the reserved-recording information for the broadcast programs stored in the memory comprises a channel number, a recording start point in time and a recording end point in time of each broadcast program to be recorded, and an automatic (AUTO) recording speed mode.

10. The reserved-recording apparatus according to claim 7, wherein the detection means detects and outputs the state signals of a supply reel and a take-up reel of the recorder, and a frequency generator (FG) signal of a capstan motor.

11. The reserved-recording apparatus according to claim 7, wherein the first recording speed mode is a standard play recording speed (SP) mode which is a standard recording speed of the recording medium, and the second recording speed mode is a super long play recording speed (SLP) mode which is ⅓ of the standard recording speed.

12. The reserved-recording apparatus according to claim 7, wherein the recording medium is a video cassette tape and the recorder is a video cassette recorder (VCR).

13. An apparatus for reserved-recording a plurality of broadcast programs, comprising:

a key input portion for inputting reserved-recording information for the plurality of broadcast programs to be recorded;

a memory for storing the reserved-recording information input from the key input portion;

a timer for checking and outputting time information for a current time of a system, and a recording start time and a recording end time of each of the broadcast programs to be recorded;

detection means for detecting and outputting signals of a remaining length of a recording medium loaded into a recorder;

a system controller for analyzing the signals received from the detection means to calculate a remaining time of the recording medium in a standard play recording speed mode (SP), calculating a total reserved-recording remaining time based on the reserved-recording information for the plurality of broadcast programs stored in the memory and the time information of the timer to thereby calculate a just-recording time, the system controller operative to calculate the just-recording time by the following equation, $$J = \frac{(R' - T)}{2}$$

in which J represents the just-recording time, R' represents a total reserved-recording remaining time, and T represents the remaining time of the recording medium and, after comprising a calculated just-recording time with the remaining time of the recording medium, outputting a first control signal corresponding to a first recording speed mode when the calculated just-recording time is shorter than the remaining time of the recording medium, and outputting a second control signal corresponding to a second recording speed mode slower than the first recording speed mode when the just-recording time is equal to or longer than the remaining time of the recording medium; and recordingmeans for recording the broadcast programs on the recording medium by producing motor drive signals corresponding to the first and second control signals from the system controller and driving motors based on the motor drive signals.

* * * * *